United States Patent
Misra

(10) Patent No.: US 8,385,605 B2
(45) Date of Patent: *Feb. 26, 2013

(54) IMAGE BASED TURING TEST

(75) Inventor: Deapesh Misra, Fairfax, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/185,606

(22) Filed: Jul. 19, 2011

(65) Prior Publication Data

US 2012/0033859 A1    Feb. 9, 2012

Related U.S. Application Data

(63) Continuation of application No. 11/854,592, filed on Sep. 13, 2007, now Pat. No. 8,019,127.

(60) Provisional application No. 60/825,458, filed on Sep. 13, 2006.

(51) Int. Cl.
G06K 9/00 (2006.01)
G06F 15/16 (2006.01)

(52) U.S. Cl. ......... 382/115; 382/118; 382/260; 709/227

(58) Field of Classification Search .............. 382/154, 382/305, 115, 116, 117, 118, 151, 152, 153, 382/155, 190, 203, 232, 260, 254, 266, 292; 726/2, 3, 5, 7, 26, 21, 22; 709/206, 225, 709/223, 204, 207, 229, 203, 201, 227; 713/184, 713/182, 168, 150; 707/E17.014, E17.001, 707/E17.095, E17.102, E17.108, E17.143; 705/14.73, 1.1, 14.4

See application file for complete search history.

(56) References Cited

U.S. PATENT DOCUMENTS 8,019,127 B2 *  9/2011  Misra ........................ 382/115

* cited by examiner

Primary Examiner — Sheela Chawan
(74) Attorney, Agent, or Firm — David Grossman

(57) ABSTRACT

A system and method for determining if a computer user is a human or a computer program. A computer user is presented with a series of images, the series of images including: at least two related images of an object, at least one of the at least two related images independently processed using an image modifying algorithm; and at least one unrelated image. The computer user is then requested to identify the related images from the series of images. These image identifications are received from the computer user. A determination is made that the computer user is: a human if the image identifications only identify the related images from the series of images; and a non-human if the image identifications do not only identify the related images from the series of images.

20 Claims, 12 Drawing Sheets

CAPTCHA Test

Please select the related images
610 related image 1
distortion 1
620 unrelated image 1
distortion 4
650 unrelated image 2
distortion 5
630 related image 2
distortion 2
660 unrelated image 3
distortion 6
640 related image 3
distortion 3
670

FIGURE 6

IMAGE BASED TURING TEST

CROSS-REFERENCE TO RELATED APPLICATIONS

This application is a continuation of U.S. patent application Ser. No. 11/854,592, filed Sep. 13, 2007 now U.S. Pat. No. 8,019,127, which claims the benefit of U.S. Provisional Application No. 60/825,458, filed Sep. 13, 2006, entitled "An Automated Public Turing Test," which are hereby incorporated by reference in their entireties.

BACKGROUND

Web-based services are becoming more and more ubiquitous and in many situations, these web based services are replacing human-to-human interactions. Schemes which implicitly assume that the other party on the internet is a human, are susceptible to being deceived by programs which pretend to be humans. Such web bots generally have a malicious intent. Thus, the need to authenticate that the other party on the web-based service is a human and not a potentially malicious program is on the rise.

Human Interactive Proofs (HIPs) are schemes which require an interaction from a human user that is tough for a program to simulate. CAPTCHAs are a class of HIPs which are tests that are so designed that humans can easily pass them while machines have a very tough time passing them. In other words, a CAPTCHA is a type of challenge-response test that may be used to differentiate between human users and automated programs on the web. "CAPTCHA" is an acronym for "Completely Automated Public Turing test to tell Computers and Humans Apart", trademarked by Carnegie Mellon University. "CAPTCHA" itself loosely means the test, the test taking process and the individual test questions comprising a test. Thus such HIPs try to prevent malicious programs while allowing humans to access the web services they are trying to secure. A CAPTCHA generally involves one computer (often a server) asking a user to complete a test. While the computer program may be able to generate and grade the test, computer programs are generally not able to solve such a test on its own. Because computer programs are generally unable to solve a CAPTCHA, any user entering a correct solution may be presumed to be human. However, a CAPTCHA need not be such that computers can never solve them at all. Because a CAPTCHA is generally administered by a computer, in contrast to the standard Turing test that is administered by a human, a CAPTCHA is sometimes described as a reverse Turing test. Additional requirements for a test to be called a CAPTCHA may include: (1) test generation code and data should be public; and (2) the test should automatically be generated and graded by a machine. Ideally, although not always the case, a CAPTCHA test would be such that an average computer user has no difficulty in passing it, and feels at ease while going through the test.

The use of CAPTCHAs in web interfaces, it is hoped will keep such Bots from misusing the web service. Human users will be easily able to authenticate themselves as being human by passing the tests while machines will typically fail. Some practical examples of web services where CAPTCHAs are required are: online polls, preventing spammers from getting free e-mail ids, preventing chat bots from irritating people in chat rooms, preventing automated online dictionary attacks in password systems, preventing unruly search engine bots from indexing private web pages, preventing web bots from adding advertisements to comment fields in Blogs etc. As the web replaces human to human physical interaction such examples are bound to increase.

A common type of CAPTCHA requires that the user type the letters of a distorted image, sometimes with the addition of an obscured sequence of letters or digits that appears on the screen. A person's ability to pass this CAPTCHA may be related to the person's familiarity with the language that the letters or digits originate. Many of these CAPTCHAs currently in use are English word based CAPTCHAs. The English word based CAPTCHAs irrespective of whether they use or do not use dictionary words, make the assumption that the test taker is familiar with English letters. This might not be true for international users of international web service providers, (e.g. Yahoo). Word based CAPTCHAs present a distorted image of a word composed of English letters to the user. The human user is able to apply error correction to the image to decipher the word while a machine is at a loss to know the word. The machine based OCR systems have not advanced so much as to reach the level of the error correction that a human can perform on distorted letters.

There are a few image based CAPTCHAs. The human face image based scheme "Artifacial," makes use of the fact that a human can quickly detect a human face in an image with a highly cluttered background. (See Y. Rui and Z. Liu. Artifacial: automated reverse turing test using facial features. In MULTIMEDIA '03: Proceedings of the eleventh ACM international conference on Multimedia, pages 295-298, New York, N.Y., USA, 2003. ACM Press). This CAPTCHA is merely a human face detection problem and requires a user to identify a particular location within an image.

'Implicit CAPTCHAs' make use of images in a much more general way. (See H. S. Baird and J. L. Bentley. Implicit captchas. In Proceedings of SPIE/IS&T Conference on Document Recognition and Retrieval XII, 2005). The user is supposed to interact with the picture by clicking on some part of it and thus pass the test. The image in this scheme provides the background for the test, upon which an interaction based task is built. This type of CAPTCHA is an object detection problem and requires a user to identify a particular location within an image.

In the scheme "Image Recognition CAPTCHAs," the hardness of the problem is provided by the one way transformation between words and pictures. (See M. Chew and J. D. Tygar. Image recognition captchas. In ISC, pages 268-279, 2004). For a machine, it is easy to get pictures corresponding to a particular chosen word, but tough, the other way around. Thus given pictures associated with a word, the human can easily find the word while the machine will fail. This scheme plays around with a few possibilities of this mapping between words and their associated pictures. This is a complicated scheme that requires a user to match a cultural term with a image of an object.

What is a good CAPTCHA test today may break in the years to come. Such a CAPTCHA test will also be a good test. What is needed is a culturally universal CAPTCHA that a human can pass, independently of the person's familiarity with any particular language or culture and that a computer will have difficulty passing for the foreseeable future.

BRIEF DESCRIPTION OF THE SEVERAL VIEWS OF THE DRAWINGS

FIG. 6 is an illustration of a CAPTCHA test presentation as per an aspect of an embodiment of the present invention.

DETAILED DESCRIPTION OF EMBODIMENTS

Embodiments of the present invention are image based CAPTCHA's that a human can pass, independently of the person's familiarity with any particular language or culture. Disclosed are several embodiments that present related and unrelated images, many or all of which have been subjected to a distortion, to a computer user. The computer user is then asked to identify those images that are related. A determination is then made as to whether the computer user is a human being or not based on the computer users ability to properly identify the related images.

Figure 1:
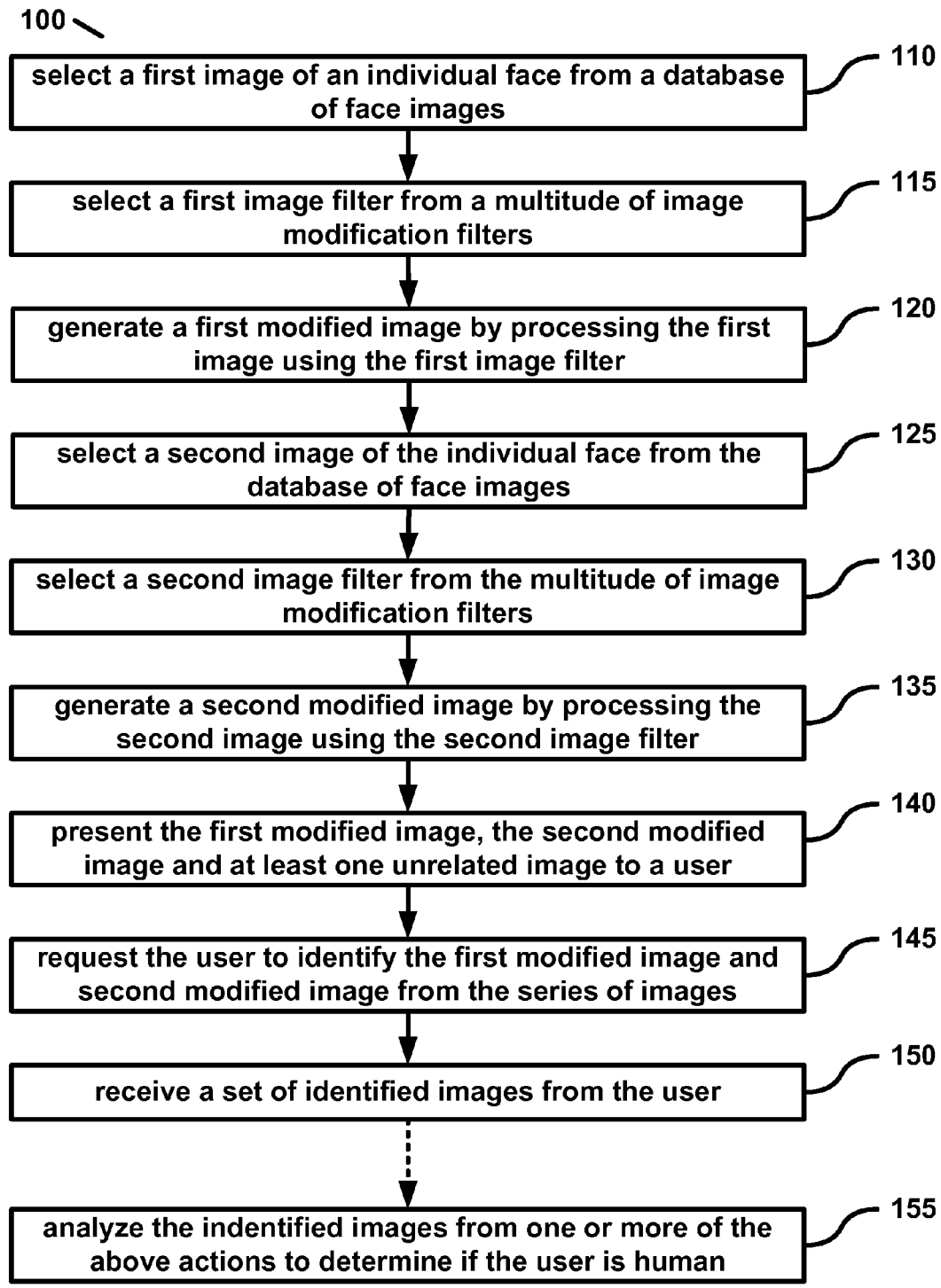
FIG. 1 is a flow diagram of a CAPTCHA that uses images of faces as per an aspect of an embodiment of the present invention.

FIG. 1 is a flow diagram of a CAPTCHA that uses images of human faces as per an aspect of an embodiment of the present invention. This embodiment takes advantage of the fact that recognizing human faces is a relatively difficult task for computers, but is relatively easy for humans. In the test, photographs of human faces may be distorted using different image processing transformations. The photographs may be obtained from numerous sources including a public database. The user is asked to match distorted photographs of several different human subjects. The automatic generation and evaluation of tests may be performed using an image processing tool such as the open-source image processing tool Gimp, a GNU Image Manipulation Program available at "www.gimp.org." This embodiment has the desirable and useful property of being easy for humans while being difficult for programs to solve. Also the level of comfort in passing these tests is high, independently of the person's familiarity with the English language, when compared to other English text based CAPTCHAs.

This embodiment utilizes the fact that humans are better than computers at recognizing images such as human faces. For a machine this task is still very difficult. (See W. Zhao, R. Chellappa, P. J. Phillips, and A. Rosenfeld. Face recognition: A literature survey. ACM Comput. Sum, 35(4):399-458, 2003). Though a lot of work has been done in the area of face recognition by machines, as of now, it is still a hard problem for machines. Moreover there is a good level of understanding as to how hard this problem is. This CAPTCHA exploits the property that given two distorted images of a human face, the human user can match these two images as being of the same person quickly, while for a computer program it is very tough to match these two distorted images.

The user may be presented with sets of distorted human face images. Each set may have the distorted images of the same group of people. Each set could have at least four to five images to make random guessing attack less successful. The user is expected to match the same person's faces in these two sets to pass the tests.

The generation of the CAPTCHA may require a database of images such as human face images and a mechanism to distort these images. It may be advantageous that the process of creation and evaluation of the images can be automated. The images may be chosen from anyone of the publicly available face databases such as the FERET database available from the National Institute of Standards; and the Yale Face Database available from the Department of Computer Science at Yale University. Image processing tools such as the Gimp can be easily automated to create the distortions and apply them to the photographs. The distortions applied to faces may be cleverly chosen so as to be able to defeat the face recognition algorithms.

FIG. 1 is a flow diagram of a CAPTCHA that uses images of faces as per an aspect of an embodiment of the present invention. A first image of an individual face may be selected from a multitude of face images at 110 and a first image filter may be selected from a multitude of image modification filters at 115. Both the multitude of face images and multitude of image modification filters may be organized in one or more databases. A first modified image may be generated at 120 by processing the first image using the first image filter. In this disclosure, the terms image filter and image algorithm are used interchangeably. In essence, an image filter may be considered to be an embodiment to an image algorithm. In both cases, the terms refer to a mechanism that can change the appearance of an image in a predetermined way.

A second image of the individual face may be selected from the multitude of face images at 125 and a second image filter may be selected from a multitude of image modification filters at 130. Preferably, the second image is sufficiently different from the first image that a human identify that both images are of the same individual but that a computer program cannot identify that both images are of the same individual. However, to make the task even more difficult for a computer, a second modified image may be created by moderately distorting the second image using the second image filter at 135.

At 140, a series of images may be presented to the computer user. The series of images should include: the first modified image; the second modified image; and at least one unrelated image. The computer user may then be prompted to identify the first modified image and second modified image from the series of presented images at 145. The prompting may take place many ways including a vocal request, a written request, or merely by presenting the computer user with a multiple selection form.

The set of identified images may be received from the computer user for analysis at 150. The phrase "set of identified images" is intended to mean any information that communicates the computer user's identification of the related images from the series of presented images. At 155, the set of identified images may be analyzed to determine if the user is most likely a human being or a computer program. If only the first modified image and second modified image from the set of identified images were properly identified, then the user is most likely a human being. In contrast, if only the first modified image and second modified image from the set of identified images were not properly identified by the computer user, then the computer user is most likely non-human. (e.g. a computer program). This analysis may be made after one round of testing, or alternatively after several rounds of testing. In the case that the analysis is done after several rounds of testing, the results of each round may be taken into consideration in making a final determination as to whether the computer user is a human or not.

Figure 2:
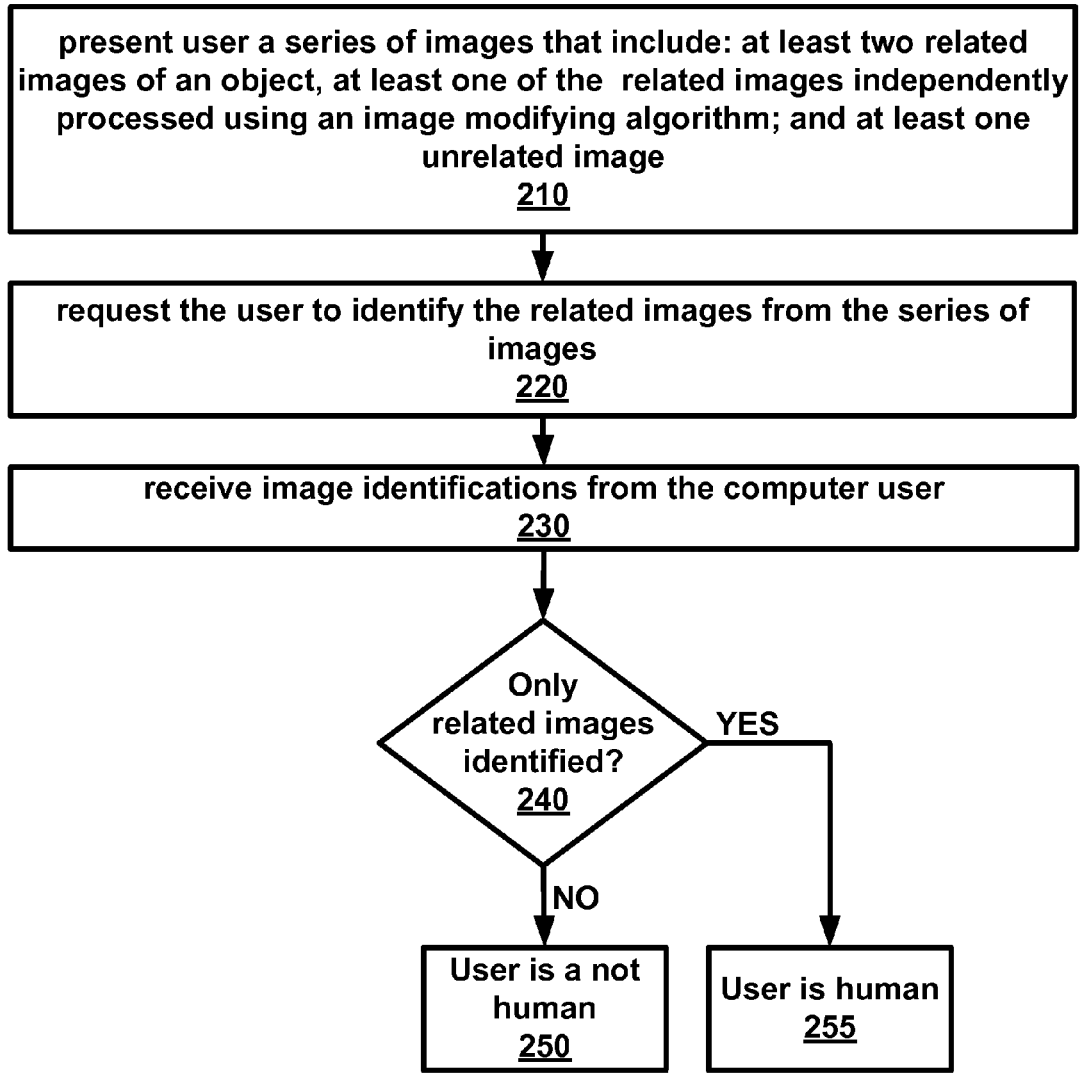
FIG. 2 is a flow diagram of an alternative CAPTCHA that uses images of an object (including a face) as per an aspect of an embodiment of the present invention.

FIG. 2 is a flow diagram of an alternative CAPTCHA that uses images of an object (including a face) as per an aspect of an embodiment of the present invention. At 210, a computer user is presented with a series of images. The images should include: at least two related images of the object where at least one of the related images is independently processed using an image modifying algorithm (or filter); and at least one unrelated image. The object may be many things. For example the object could be an inanimate object such as a chair, a house, or a picture. A picture may just be another image obtained from various sources such as the Internet or an electronic capture device. Alternatively, the object may be an animate object such a human face, a cat, or a dog.

Preferably, the images are similar enough for a human being to recognize that the images are of the object, but that a computer program will not be capable of recognizing that the images are of the same object. To make it even more difficult for a computer to recognize that images are related, at least some of the related images may be different images of the same object. These different images may include differences such as different lighting, different angles and different backgrounds. In some cases, the images may be similar or identical before at least one of them is processed. In these cases, it may be important that the independent processing of at least one of these related images using an image modifying algorithm distort the processed image.

One or more of the related images may be selected from a database. The images may be selected randomly to increase the difficulty for a non human to learn how to pick related images. Alternatively, the images may be stored in a database, or hard coded into a CATCHA program.

The image modifying algorithm should distort the processed image sufficiently to prevent a computer program from recognizing that the images are of the same object while a still allowing the average human to still recognize that the images are of the same object. Therefore, it may be preferable that at least one of the multitude of image modifying algorithms be a distortion algorithm. Distortion algorithms may operate to warp or re-arrange the contents of an image. In ways similar to fun-house minors, the distortions may distort images to varying intensities. The image itself may remain intact, but the location of the various parts of the image could be displaced so that the object in the image is still recognizable to a human. Examples of simple distortions that a distortion algorithm may use may include: flipping, minoring, transposing, transversing, rotating, clipping, stretching, shearing, displacing, mapping and modifying coordinates. However, one skilled in the art will recognize that some of the distortion algorithms may perform little or no distortion. The main point of a distortion algorithm is to create differences between related images. In this vain, it may even be possible that related images may be the same image processed by different image modifying algorithms.

At 220, the computer user may be prompted to identify the related images from the series of images. The image identifications from the computer user may be received at 230. Using the image identifications from the computer user, a determination may be made to determine if the computer user is or is not human at 240. If only the related images from the set of image identifications were properly identified, then the user is most likely a human being (250). Otherwise, the computer user is most likely non-human (255).

The image modifying algorithm may be selected from a multitude of image modifying algorithms. The multitude of image modifying algorithms may be part of a CAPTCHA computer program directly or dynamically acquired using a database. In some embodiments the selection process may be random or per a specific selection criteria.

Figure 3:
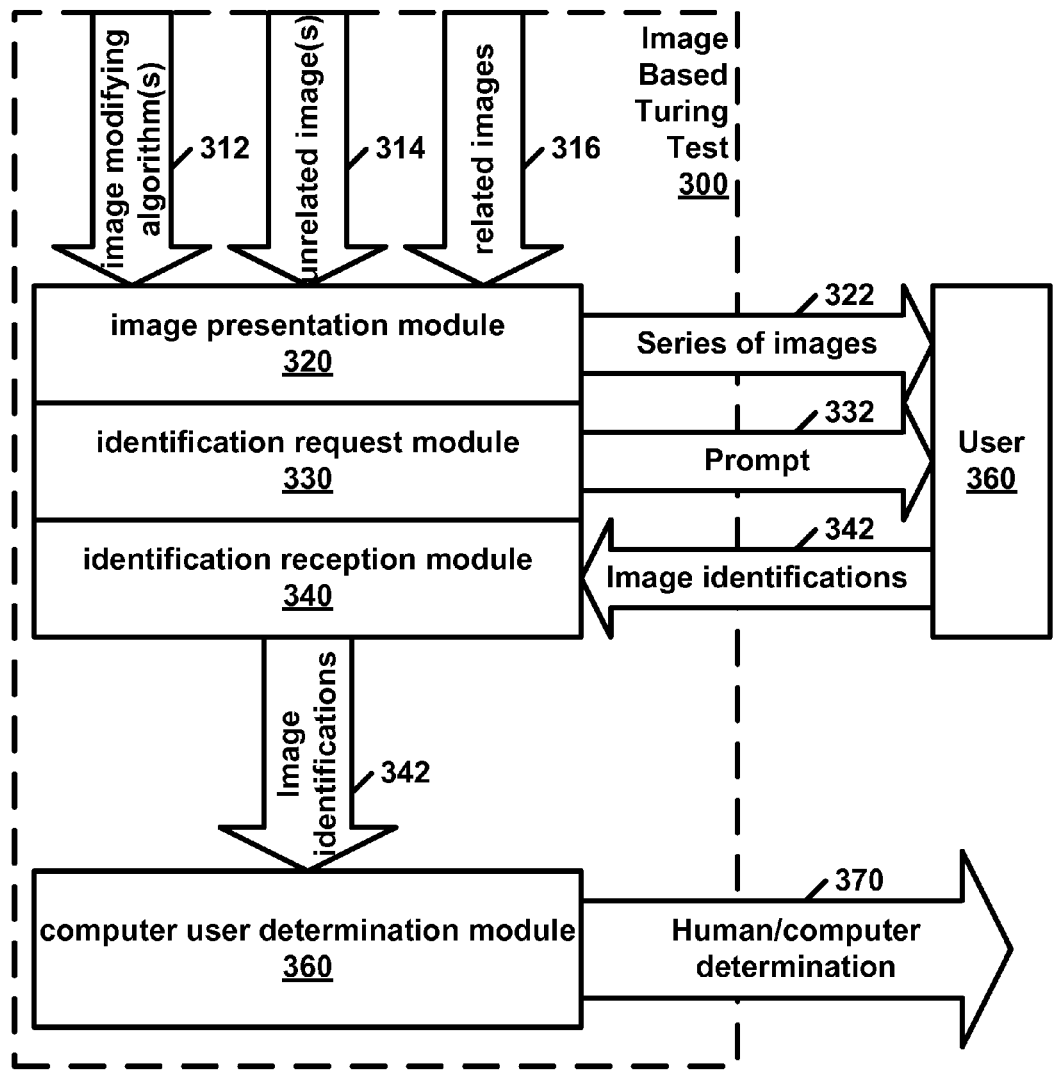
FIG. 3 is a block diagram of a CAPTCHA system as per an aspect of an embodiment of the present invention.

FIG. 3 is a block diagram of a CAPTCHA system as per an aspect of an embodiment of the present invention. As shown, the system 300 for determining if a computer user is a human or a computer program includes: an image presentation module 320, an identification reception module 330, an identification reception module 340, and a computer user determination module 360. In this disclosure the term module means a self-contained component of a system, capable of interfacing with other components. In particular, it is anticipated that embodiments of the present invention may be constructed using software, hardware and network based modules. For example, the image processing module may pass images with instructions to image modifying modules. The image modifying module may actually be a self contained program or series of programs that may reside on the same computer, or reside across a network on another computer. The modules may be stored on a tangible computer readable medium as a series of processor executable instructions that when executed by one or more processors, performs their useful function. Similarly, a module may be constructed using hardware such as an ASIC, an FPGA, or discrete hardware. This may be useful in some instances to provide fast signal processing used by one of the image modifying algorithms.

The image presentation module 320 is preferably configured to present to the computer user 360 a series of images 322. The series of images should include: at least two related images of an object 316, at least one of the at least two related images independently processed using an image modifying algorithm(s) 312; and at least one unrelated image 314.

The identification request module 330 is preferably configured to prompt 332 the computer user 332 to identify the related images 316 from the series of images 322. In response to the prompt, it is hoped that the computer user 360 will identify from the series of images 322 those images that are related 316. The identification reception module 340 may then receive image identifications 322 from the computer user 360. The computer user determination module may analyze the image identifications 322 to make a determination 370 of whether the computer user is a human or a computer program. The determination 370 should be that the computer user 360 is a human if the image identifications 342 only identify the related images 316 from the series of images 422. In contrast, the determination 370 should be that the computer user 360 is NOT a human if the image identifications 342 do NOT only identify the related images 316 from the series of images 322.

Figure 4:
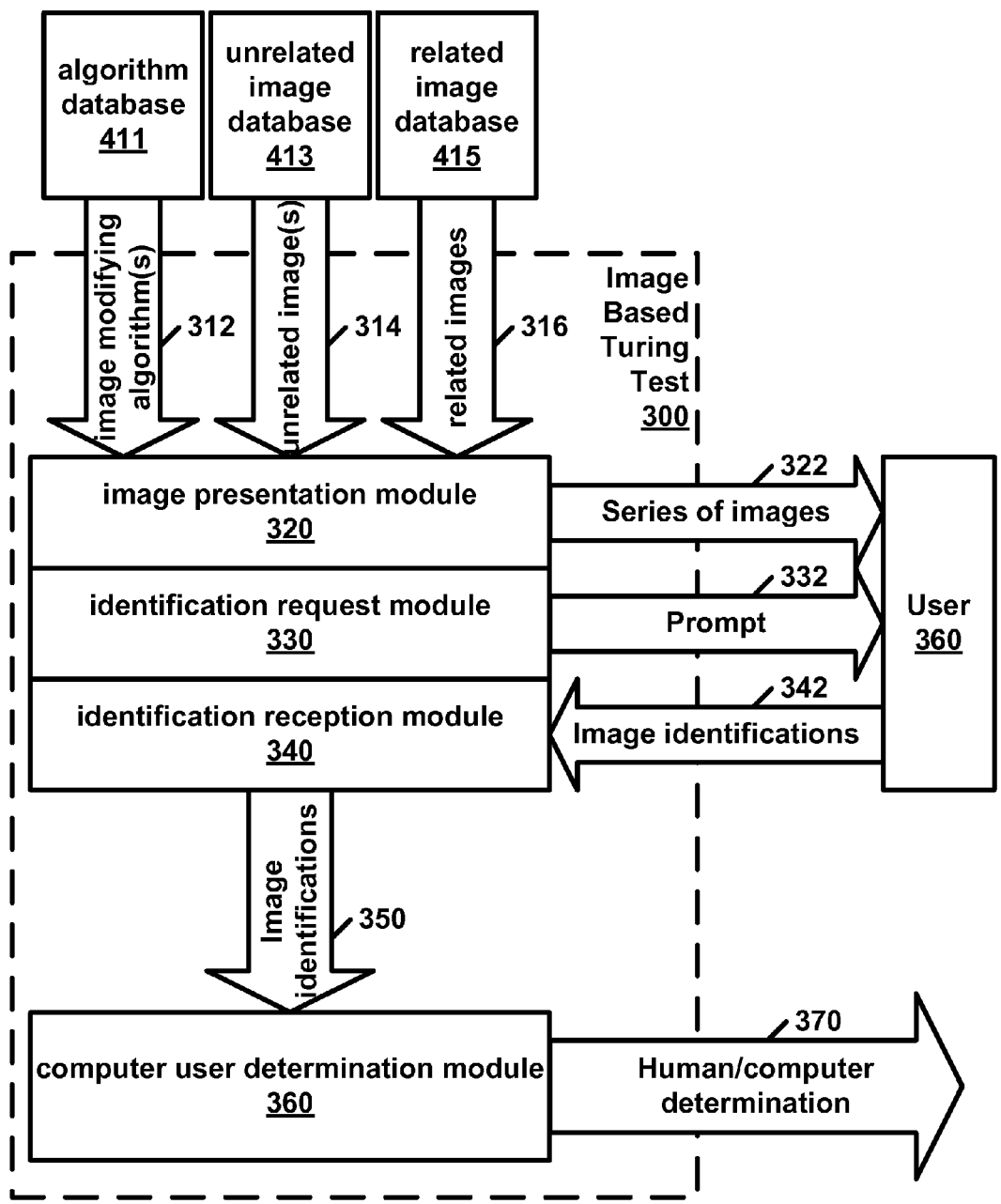
FIG. 4 is a block diagram of an embodiment of a CAPTCHA system similar to FIG. 3 that illustrates the use of databases to manage images and image filters.
Figure 5:
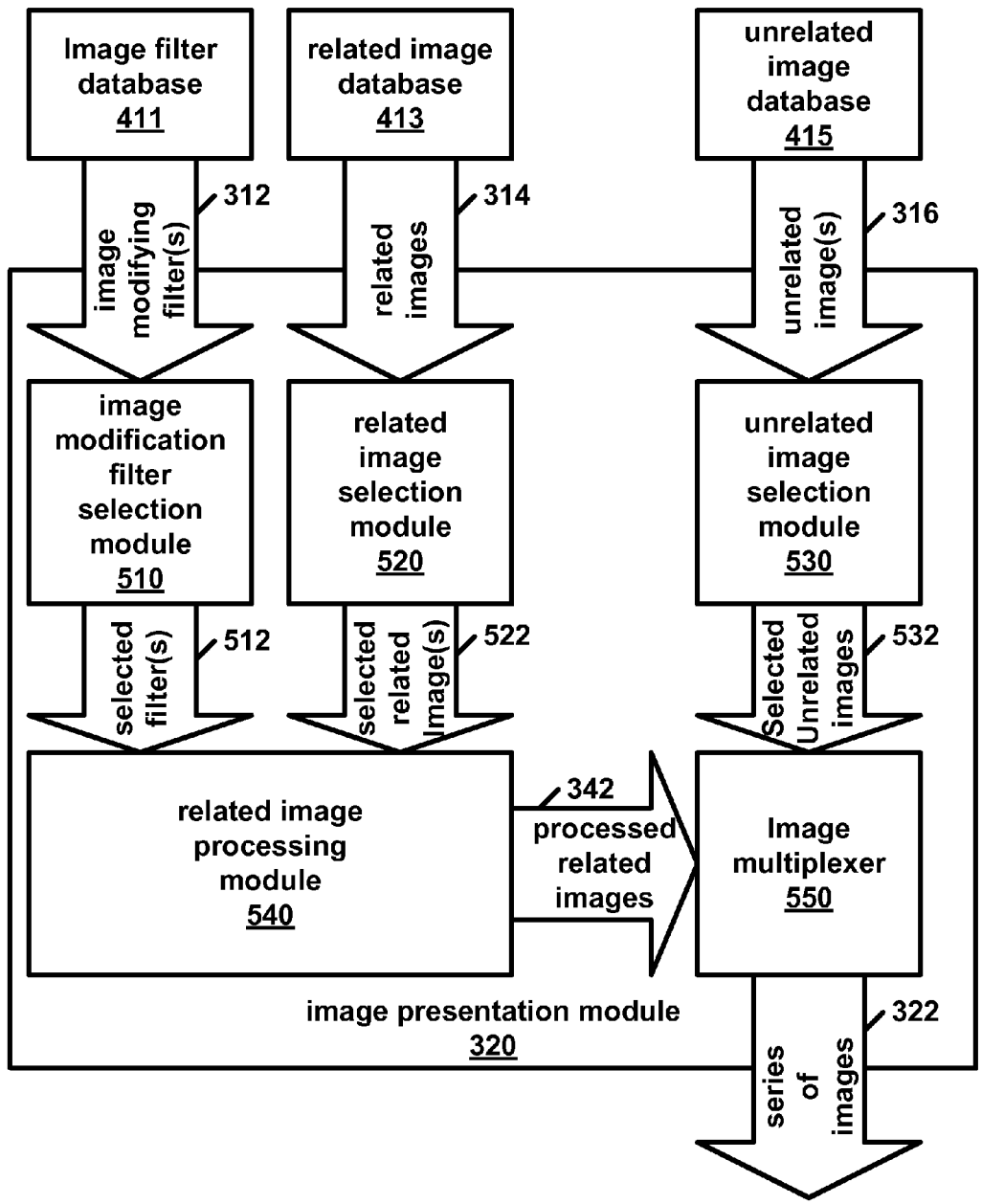
FIG. 5 is a block diagram of an embodiment of an image processing module as per an aspect of an embodiment of the present invention.

FIG. 4 is a block diagram of an embodiment of a CAPTCHA system similar to FIG. 3 that illustrates the use of databases to manage images and image filters. FIG. 5 is a block diagram of an embodiment of an image processing module 320 as per an aspect of an embodiment of the present invention. The image modification filter selection module 510 may select one or more image modification filters 312 from a source of image modification filters such as an image filter database 411, a series of available filter modules, or the like. The selection process may be according to a systematic algorithm such as using an incremental selection mechanism or a pseudo random selection mechanism.

Related image selection module 520 may select one or more related images 314 from a source of related images such as a related image database 413. One skilled in the art will recognize that other sources of related images may be used. For example, the images could be acquired: using an image acquisition mechanism such as a camera, from the internet, or from a file directory populated with related images. In general, it is advantageous that the related images be selected in such a way that a human can tell that they are related. One way to accomplish this is to use a multitude of images of an object that are taken from different angles or a face that is making different facial expressions. It is even possible that pictures of different but related objects could be selected (e.g. pictures of boats).

The selected related image(s) 522 and selected filters(s) 512 may then be provided to a related image processing module 540. This related image processing module 540 may then apply the selected filter(s) 512 to the selected related image(s) 522 to generate processed related images 542. It may be advantageous in many cases that the related image processing module 540 is careful not to apply the same filter to images of the same object. Although many of the selected filters 512 may be distortion filters, in some cases, the related image processing module 540 may pass a related image through without processing it with a filter. Again, the important factor here is that the related images have a sufficient differences to stump a computer but not a human as to their relation.

Unrelated image selection module 530 may select one or more unrelated image(s) 316 from a source of unrelated images such as an unrelated image database 415. Other sources of unrelated images may be used. In general, the unrelated images should be chosen to be sufficiently different from the related images to allow a human to identify differences while still making if difficult for a computer to identify differences. The selected unrelated images 532 and the processed related images 342 may be provided to an image multiplexer 550 to the images as a series images 322 for presentation to a computer user 360.

FIG. 6 is an illustration of a CAPTCHA test presentation as per an aspect of an embodiment of the present invention. In this figure, a prompt 610 requests that a computer user 360 view a series of images 322. The series of images 322 may consist of related images (620, 660 and 670) and unrelated images (630, 640 and 650). Although the images are shown in two columns, there could be many more configurations including additional columns, images shown in a circular or other geometric configuration or images places in a random or pseudo random location. The computer user 360 may select the images that are perceived by the computer user 360 as being related by the prompt 610.

In some embodiments, no related images may be presented. In this case the computer user 360 should not select any images. Alternatively, it may be that all of the images are related. In this case, the computer user 360 should select all of the images. This information may be returned to the identification request module 340.

A discussion based on some real world experiments and embodiments follows. Some embodiments may make use of human face photograph databases that are publicly available without a need for the database to be secret. Any face database can be chosen. For an experiment, the UMIST Face database was used in experiments. (See H. Wechsler, P. J. Phillips, V. Bruce, F. Fogelman-Soulie, and T. S. Huang, editors. Characterizing Virtual Eigensignatures for General Purpose Face Recognition, volume 163, 1998). Since there is some understanding that image recognition algorithms perhaps are better at recognizing female subjects better, the experiment did not use female photographs. The frontal face shots of the people in the database were distorted to create the test.

The use of commonly available image processing tools was looked into for the experiment. Successful results were obtained with the use of the GNU licensed Open Source tool 'Gimp 2.2' available at gimp.org and sourceforge.net. This tool which is available for the Linux environment and also for the Windows environment is particularly suitable for this task since it has a scripting language called 'Script-Fu,' which allows automatic creation of new distortions and automatic creation of the CAPTCHAs.

The tool comes with built in image manipulation effects called "Filters." These basic built-in filters may used to create the distortion effects. The user can easily generate a large number of new basic filters aka image distortion effects. These image distortion effects can be easily extended to create new effects as and when the attackers are able to successfully attack a distortion scheme that is being currently used.

For the distortions that we used in tests, there were a few already existing filters in Gimp which satisfied our requirements. These distortions need to be such that given the distorted image it should not be easily possible to recover the original image by applying something akin to an inverse transformation. Thus a few distortions were narrowed down to from the already available set in Gimp 2.2.

From the list of built-in filters that come shipped with the tool, the following filters provided good results: (1) Glass Tile filter; (2) Illusion Filter under the category "Map;" and Spread filter under the category "Noise." Other distortions may be used to defeat face recognition algorithms. This in fact, is a strength of this scheme, that new better and attack resistant distortions may be used when required.

For human faces, random distortion were not used to keep the output aesthetically pleasing. While on the other hand, when choosing the parameters for the distortions, care was taken to ensure that the distorted output was not too simple for an image recognition scheme applied by a machine. Acceptable parameter bounds for the distortions were set for the various distortions. At run time, random values for the parameters were chosen for the distortion. Distortions parameters chosen were:

Glass tile: parameter: 16
Illusion: parameter: divisions 3, mode 1
Spread: parameter: 15

Since the image database is public, an attacker may be able to access the same database and in spare time apply distortions to all the images and store such images for comparison later during an attack. One way to prevent this is to select the distortion such that it is sensitive to the parameters of the distortion. These parameters may be chosen at run time.

A first CAPTCHA scheme, that uses human faces in image recognition, requires a user to recognize the same image of a subject with two different distortions applied to it. Thus in effect, the human user is performing an image recognition task, the image being a human face. As examples, in FIG. 7 and FIG. 8, three distortion effects are applied to a randomly chosen human face image from the database.

Figure 7:
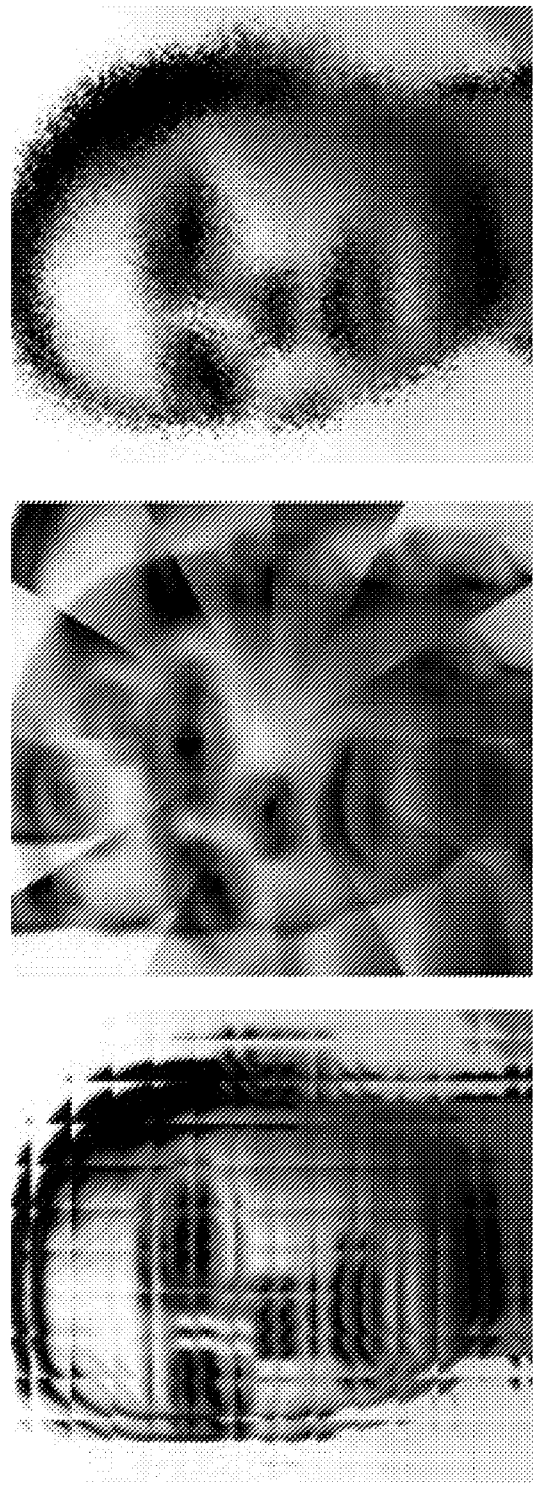
FIG. 7 shows a randomly chosen human face image processed using three distortion effects as per an aspect of an embodiment of the present invention.
Figure 8:
FIG. 8 shows another randomly chosen human face image processed using three distortion effects as per an aspect of an embodiment of the present invention.
Figure 9:
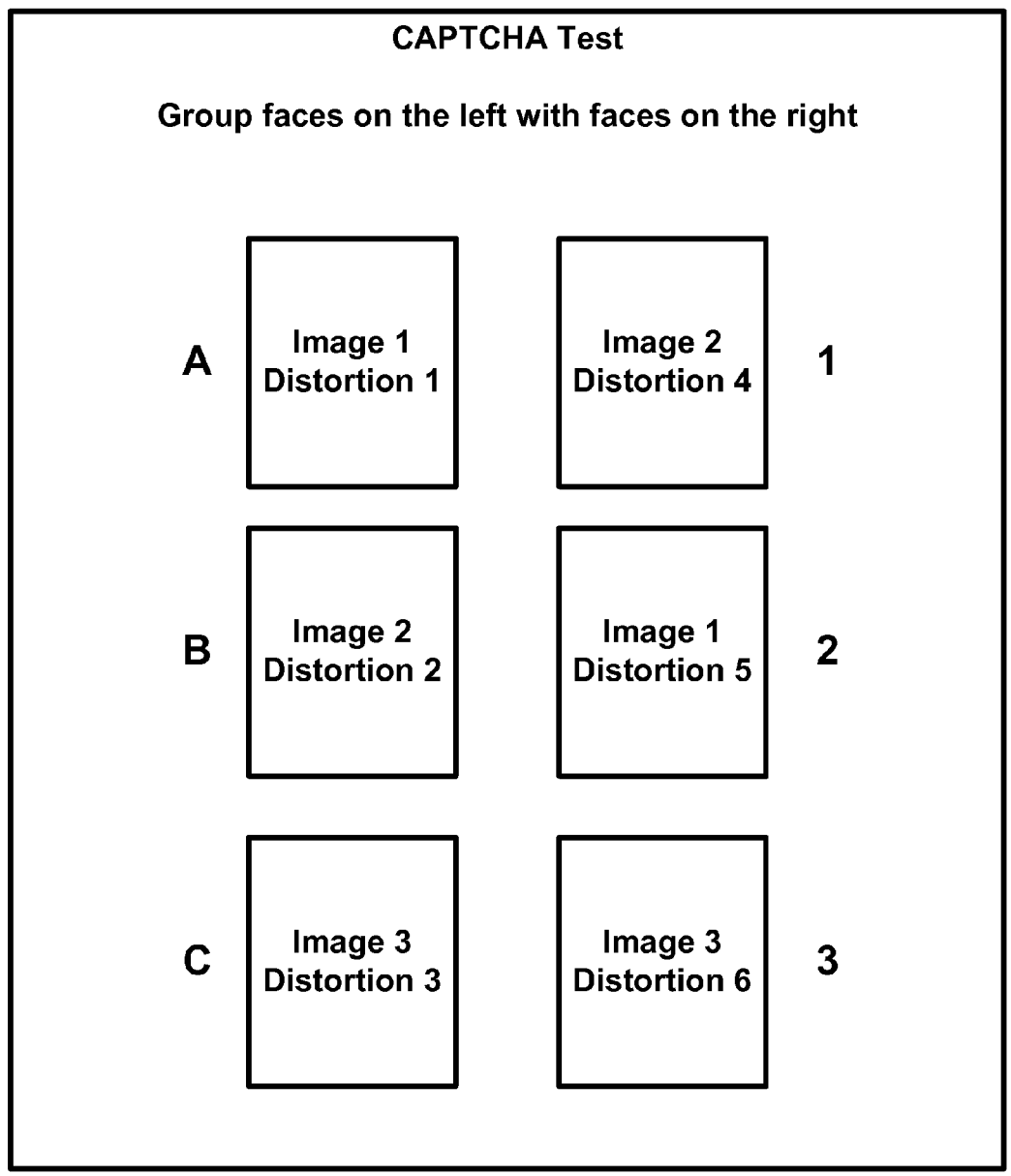
FIG. 9 is an illustration of a CAPTCHA test presentation as per an aspect of an embodiment of the present invention.

The names of the images are a variant of the names given in the UMIST database and the name mapping between the distorted images and the applied filters being:

Glass Tile filter: _gt
Illusion filter under the category 'Map': _mi
Spread filter under the category 'Noise': _ns FIG. 7 shows a first illustrative CAPTCHA Scheme as per an aspect of an embodiment of the present invention. To make the scheme more robust, instead of having a constant set of two distortions, a set of many distortions may be created. Randomly at run time, two distortions from this set may be chosen and applied. These are applied to the two copies of the randomly chosen subject's image. A set of such pairs may be created. The CAPTCHA test could display around six images to the user and ask the user to match the pairs. This is as illustrated in FIG. 9 wherein the number of subject images are three. Of course, one skilled in the art will recognize that this is merely an illustration and that different numbers of images may be used, including unrelated and undistorted images.

The two distortions can be chosen such that one distortion makes it tough for holistic feature matching face recognition schemes while the other makes it tough for feature matching face recognition schemes.

Figure 10:
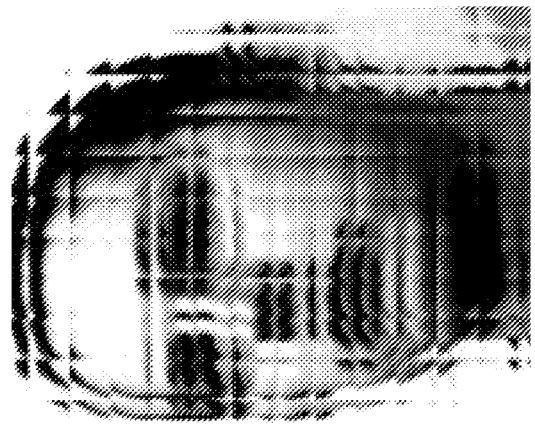
FIG. 10 shows three different human face images of a single face processed using three distortion effects as per an aspect of an embodiment of the present invention.
Figure 10:
Figure 10:
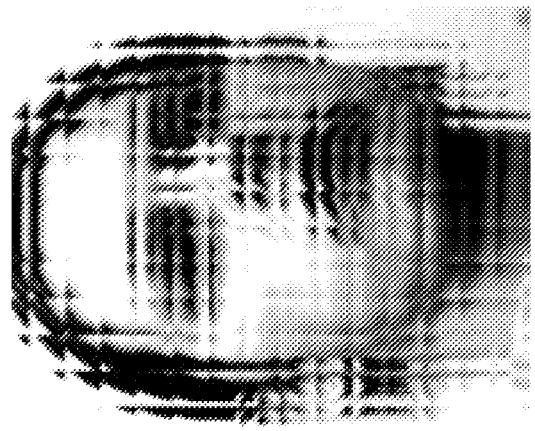
Figure 11:
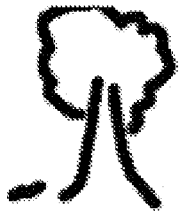
FIG. 11 is an illustration of a CAPTCHA test presentation as per an aspect of an embodiment of the present invention.

FIG. 10 illustrates another CAPTCHA Scheme as per an aspect of an embodiment of the present invention. This figure illustrates an extension to FIGS. 7 and 8. In this figure, different photos of the same individual are subjected to different distortions respectively. Different images, perhaps of the subject in two different poses may be taken, or different images with different lighting conditions or backgrounds may be taken.

In this scheme, the distortions applied need not distort the image as much as the previous scheme. The human user has to recognize the subject given the two distorted different views of the subject. This is a true human face recognition scheme. The test combines the ideas that humans can recognize human faces better than computers and do it especially much better than machines, when the images are distorted. In FIG. 10, an example having three sets of images are shown. The photos of the different poses of the same subject are generally available in face recognition related image databases. To create the CAPTCHA, a subject may be randomly chosen from the database and to different poses of this subject, randomly chosen distortions from the set of distortions are applied.

The new human face recognition scheme makes use of an area that is well researched and understood. Human face detection and recognition are still hard problems for machines to solve and this is made even harder by the application of distortions to the images. The distortions also serve to break the existing face recognition schemes. Easy extensibility of these distortions due to the use of the tool 'Gimp' ensures that as the face recognition schemes get better, newer distortions may be easily created, thus keeping this idea in vogue for a long time. The script that automatically generates the CAPTCHAs stores the answer for evaluation purposes.

A static constant database of human images with the use of a changing set of new distortions may ensure the strength of this scheme for a long time.

Existing human face databases generally consist of photographs which are taken in constrained environments. In particular, these photographs have constrained lighting, expression and poses. The creation of an image database with CAPTCHA like tests in mind (with large variations in pose, facial expressions and lighting) should result in images which are tougher to break by computer systems. This is particularly true for our illustrated FIG. 10. The use of photographs from such a database might even remove the need for distortions to be applied.

The obvious disadvantage in such a "multiple choice test" is that it is susceptible to guessing attacks. Word based CAPTCHAs have a much higher probable answer space, but at the same time are much more inconvenient for international users. Current embodiments attempt to break away from the language barrier and also attempt to create tests that are user friendly rather than strict policy enforcers. With the ease of the user in mind, these embodiments attempt to move towards the idea of "Human Friendly Human Interactive Proofs".

One attack would be to randomly guess the answers. Mitigating measures that can be used include: (1) after every wrong attempt a new test is created; and (2) the identifying label for each image itself can be a text based CAPTCHA.

Face recognition is not a new science. Understanding its current limitations and exploiting them has allowed the creation of CAPTCHA's. To make the CAPTCHA tougher against human face recognition programs, this scheme could be extended to distortions of general images rather than only human face images. The advantage being that it may be tougher to recognize general random images in comparison to recognizing human faces, since all human faces share some common features. The database could again be public in this case. The decision of what images would go into the database may be made by a human. In this case the distortions may be from a very large set as there are no aesthetic consideration requirements. Thus, at two levels the scheme has larger independence i.e., the choice of images and the choice of distortions.

Figure 12:
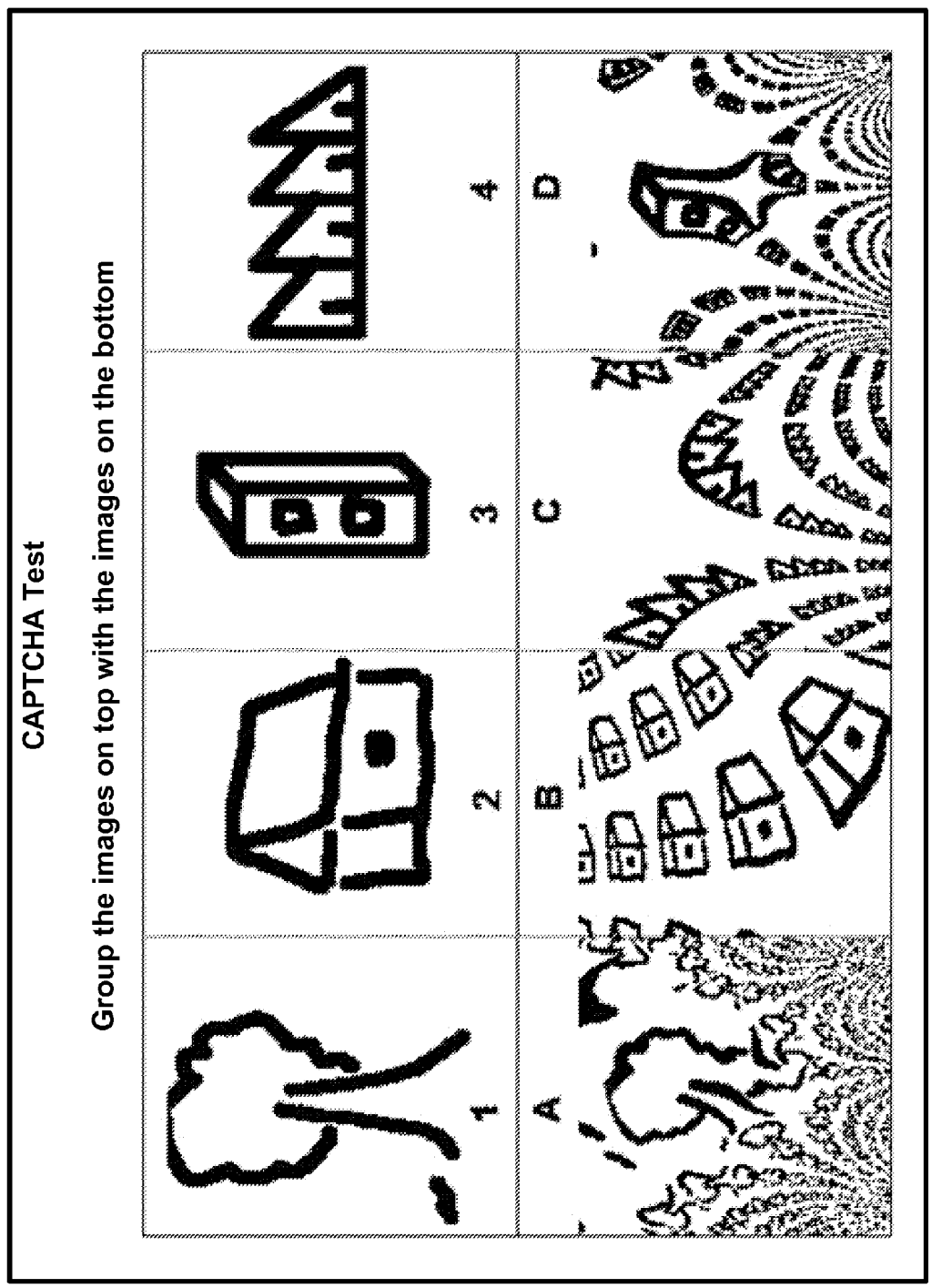
FIG. 12 is an illustration of a CAPTCHA test presentation as per an aspect of an embodiment of the present invention.

A few examples using the built in filters in Gimp, are depicted in the FIG. 12 and FIG. 13. In FIG. 12 a distortion is used to map the images onto surfaces. The user is asked to match these images. In FIG. 13, a "Fractal" is created from the image. Many such distortions are possible. Again, a clever choice of distortions will ensure that the recognition schemes fail.

Web services have to ward off malicious programs from abusing their services. This growth of abuse of services is due to the fact that most protocols have not considered that the user might not be a human. Thus to ensure that it is always a human on the other end, CAPTCHA like tests will only increase their presence on the web. Since such tests will increase the discomfort of users using the web services, it may be important to design user friendly CAPTCHAs. The disclosed embodiments using "Human friendly Human Interactive Proofs" is an attempt in that direction.

The development of image distortion effects specifically to defeat human face recognition schemes, for instance Fischerfaces and Eigenfaces would be the way ahead. As new schemes are developed to recognize human faces, new image distortion effects may need to be developed.

The disclosed embodiments cater to all of the requirements of a CAPTCHA. It is also extensible and its defenses can be easily hardened as and when required. Not only are these embodiments compliant with the requirements of being a CAPTCHA as enumerated originally earlier, they also ensure that this CAPTCHAs may be extended as artificial intelligent techniques to recognize human faces and other objects get better in future. A shift towards human friendly designs is attempted by the use of image based CAPTCHAs.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) faces. However, one skilled in the art will recognize that embodiments of the invention could be used that provide for using images that not only of objects, but of abstract concepts such as flying or walking.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A non-transitory computer readable medium comprising a series of instructions configured to cause one or more processors to perform a process to determine if a computer user is a human or a computer program, the process comprising:
   a) selecting a first image of an individual face from a multitude of face images;
   b) selecting a first image filter from a multitude of image modification filters;
   c) generating a first modified image by processing the first image using the first image filter;
   d) selecting a second image of the individual face from the multitude of face images;
   e) selecting a second image filter from the multitude of image modification filters;
   f) generating a second modified image by processing the second image using the second image filter;
   g) presenting to the computer user a series of images, the series of images including:
      i) the first modified image;
      ii) the second modified image; and
      iii) at least one unrelated image;
   h) prompting the computer user to identify the first modified image and second modified image from the series of images;
   i) receiving a set of identified images from the computer user;
   j) determining that the computer user is:
      i) a human if only the first modified image and second modified image from the set of identified images were properly identified by the computer user; and
      ii) a non-human if only the first modified image and second modified image from the set of identified images were not properly identified by the computer user.

2. A non-transitory computer readable medium comprising a series of instructions configured to cause one or more processors to perform a process to determine if a computer user is a human or a computer program, the process comprising:
   a) presenting to the computer user a series of images, the series of images including:
      i) at least two related images of an object, at least one of the at least two related images independently processed using an image modifying algorithm; and
      ii) at least one unrelated image;
   b) prompting the computer user to identify the related images from the series of images;
   c) receiving image identifications from the computer user; and
   d) determining that the computer user is:
      i) a human if the image identifications only identify the related images from the series of images; and
      ii) a non-human if the image identifications do not only identify the related images from the series of images.

3. The non-transitory computer readable medium according to claim 2, wherein the image modifying algorithm is selected from a multitude of image modifying algorithms.

4. The non-transitory computer readable medium according to claim 3, wherein the multitude of image modifying algorithms is stored in a database.

5. The non-transitory computer readable medium according to claim 3, wherein the algorithm selection is random.

6. The non-transitory computer readable medium according to claim 3, wherein at least one of the multitude of image modifying algorithms is a distortion algorithm.

7. The non-transitory computer readable medium according to claim 2, wherein the object is a human face.

8. The non-transitory computer readable medium according to claim 2, wherein at least two of the at least two related images are different images of the same object.

9. The non-transitory computer readable medium according to claim 2, wherein at least two of the at least two related images are the same image processed by different image modifying algorithms.

10. The non-transitory computer readable medium according to claim 2, wherein at least one of the multitude of image modifying algorithms performs no noticeable distortion.

11. The non-transitory computer readable medium according to claim 2, wherein at least one of the related images is selected from a database.

12. The non-transitory computer readable medium according to claim 2, wherein at least one of the related images is randomly selected from a database.

13. A non-transitory computer readable medium comprising a series of instructions configured to cause one or more processors to perform a process to determine if a computer user is a human or a computer program, the instructions including:
   a) image presentation instructions configured to present to the computer user a series of images, the series of images including:
      i) at least two related images of an object, at least one of the at least two related images independently processed using an image modifying algorithm; and
      ii) at least one unrelated image;
   b) identification request instructions configured to prompt the computer user to identify the related images from the series of images;
   c) identification reception instructions configured to receive image identifications from the computer user; and
   d) computer user determination instructions configured to determine that the computer user is:
      i) a human if the image identifications only identify the related images from the series of images; and
      ii) a non-human if the image identifications do not only identify the related images from the series of images.

14. The non-transitory computer readable medium according to claim 13, further including an image selection instructions configured to select the image modifying algorithm from a multitude of image modifying algorithms.

15. The non-transitory computer readable medium according to claim 13, wherein a multitude of image modifying algorithms are stored in a database.

16. The non-transitory computer readable medium according to claim 13, wherein at least one of the multitude of image modifying algorithms is a distortion algorithm.

17. The non-transitory computer readable medium according to claim 13, wherein the object is a human face.

18. The non-transitory computer readable medium according to claim 13, wherein at least two of the at least two related images are different images of the same object.

19. The non-transitory computer readable medium according to claim 13, wherein at least two of the at least two related images are the same image processed by different image modifying algorithms.

20. The non-transitory computer readable medium according to claim 13, wherein at least one of the multitude of image modifying algorithms performs no noticeable distortion.

* * * * *